(12) United States Patent
Kelley (10) Patent No.: US 11,693,778 B2
(45) Date of Patent: Jul. 4, 2023

(54) CACHE GROUPING FOR INCREASING PERFORMANCE AND FAIRNESS IN SHARED CACHES

(71) Applicant: Advanced Micro Devices, Inc., Santa Clara, CA (US)

(72) Inventor: John Kelley, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/118,612

(22) Filed: Dec. 11, 2020

(65) Prior Publication Data
US 2022/0188229 A1 Jun. 16, 2022

(51) Int. Cl.
*G06F 12/084* (2016.01)
*G06F 11/30* (2006.01)
*G06F 12/126* (2016.01)
*G06F 12/128* (2016.01)

(52) U.S. Cl.
CPC ........ *G06F 12/084* (2013.01); *G06F 11/3037* (2013.01); *G06F 12/126* (2013.01); *G06F 12/128* (2013.01)

(58) Field of Classification Search
CPC .. G06F 12/084; G06F 11/3037; G06F 12/126; G06F 12/128
See application file for complete search history.

(56) References Cited

U.S. PATENT DOCUMENTS

| | | | |
|---|---|---|---|
| 2002/0116576 A1* | 8/2002 | Keshava | G09G 5/001 711/129 |
| 2004/0225848 A1* | 11/2004 | Wall | G06F 21/6245 711/164 |
| 2006/0143396 A1* | 6/2006 | Cabot | G06F 12/121 711/134 |
| 2018/0260330 A1* | 9/2018 | Felter | G06F 9/5016 |

\* cited by examiner

*Primary Examiner* — Jae U Yu
(74) *Attorney, Agent, or Firm* — FIG. 1 Patents (57) ABSTRACT

A method includes monitoring one or more metrics for each of a plurality of cache users sharing a cache, and assigning each of the plurality of cache users to one of a plurality of groups based on the monitored one or more metrics.

20 Claims, 4 Drawing Sheets

CACHE GROUPING FOR INCREASING PERFORMANCE AND FAIRNESS IN SHARED CACHES

BACKGROUND

Modern computing systems have multiple central processing units (CPUs) that typically include and rely on multiple caches in a cache hierarchy to improve processor and memory performance. Compared to main memory, a cache is a smaller and faster memory device that stores data that is frequently accessed or expected to be used in the near future so that the data can be accessed with low latency. Such cache devices are often implemented in static random access memory (SRAM) and are typically located between a processing unit that issues memory requests and the main memory device.

A private cache is a cache that is only accessed by a single processing core, while a shared cache can be accessed by multiple processing cores. Upper level caches such as level 1 (L1) or level 2 (L2) caches are often implemented as private caches, while level 3 (L3) caches are implemented as shared caches. When there are several concurrent users of a shared cache, each user can access the cache in a manner that can potentially interact or interfere with the use of the cache by other users, leading to suboptimal performance for one or more of the users.

BRIEF DESCRIPTION OF THE DRAWINGS

The embodiments illustrated in the figures of the accompanying drawings herein are by way of example and not by way of limitation. In the drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

A shared cache, such as an L3 cache in a computing system, can have multiple users, where each user represents a different processing core, thread, or other entity that accesses the cache. For example, an L3 cache can have 16 or more different users. This many different users can impose different demands on the shared cache; for example, one user may be a high bandwidth thread that processes a large amount of data over time and has a high cache miss rate, while another user is a low bandwidth thread that processes less data but has a lower miss rate and is sensitive to latency caused by cache misses. In this situation and others, one or more users can unfairly interfere with use of the cache by other users. Continuing the example, the high miss rate of the high bandwidth thread can cause capacity evictions of data, which can include critical data, used by other threads. This can increase cache misses for the other threads, decreasing performance. The high bandwidth thread can also end up occupying a disproportionate amount of the shared cache capacity, decreasing the capacity available for use by other threads.

In addition, performing capacity evictions in the shared cache using a single replacement policy for all users of the cache can result in a suboptimal replacement policy being used for some of the users. For example, the optimal replacement policy for one cache user that results in the highest throughput may be a least recently used (LRU) replacement policy, in which the least recently used cache line is selected as a victim when a capacity eviction is performed, while another cache user would perform optimally with a most recently used (MRU) replacement policy, in which the most recently used line is evicted. Therefore, if the same replacement policy is applied to both of these cache users, one user will have a suboptimal replacement policy applied to its cached data. In cases where a dominant thread determines the replacement policy for the shared cache, performance of other threads using the cache may be degraded if the selected replacement policy is not suited for those threads.

In one embodiment, a computing system implementing a shared cache dynamically identifies cache users that impose similar demands on the cache, then groups together similar users and applies the same or similar policies to users in the same group. In one embodiment, cache users in the same group are associated with a set of physical ways in the shared cache, so that data for the users in the same group are stored in the same set of physical ways.

In one embodiment, different policies (e.g., replacement policies) are tested at runtime on a portion of the data from one or more of the cache users or groups of cache users to identify which policies can be used to maximize performance for those users (as measured by performance metrics such as hit or miss rate, throughput, etc.). When a new policy is identified that yields an increase in performance relative to the current policy applied to the cache user or group of cache users, the current policy is changed to the new policy in order to increase performance.

Figure 1:
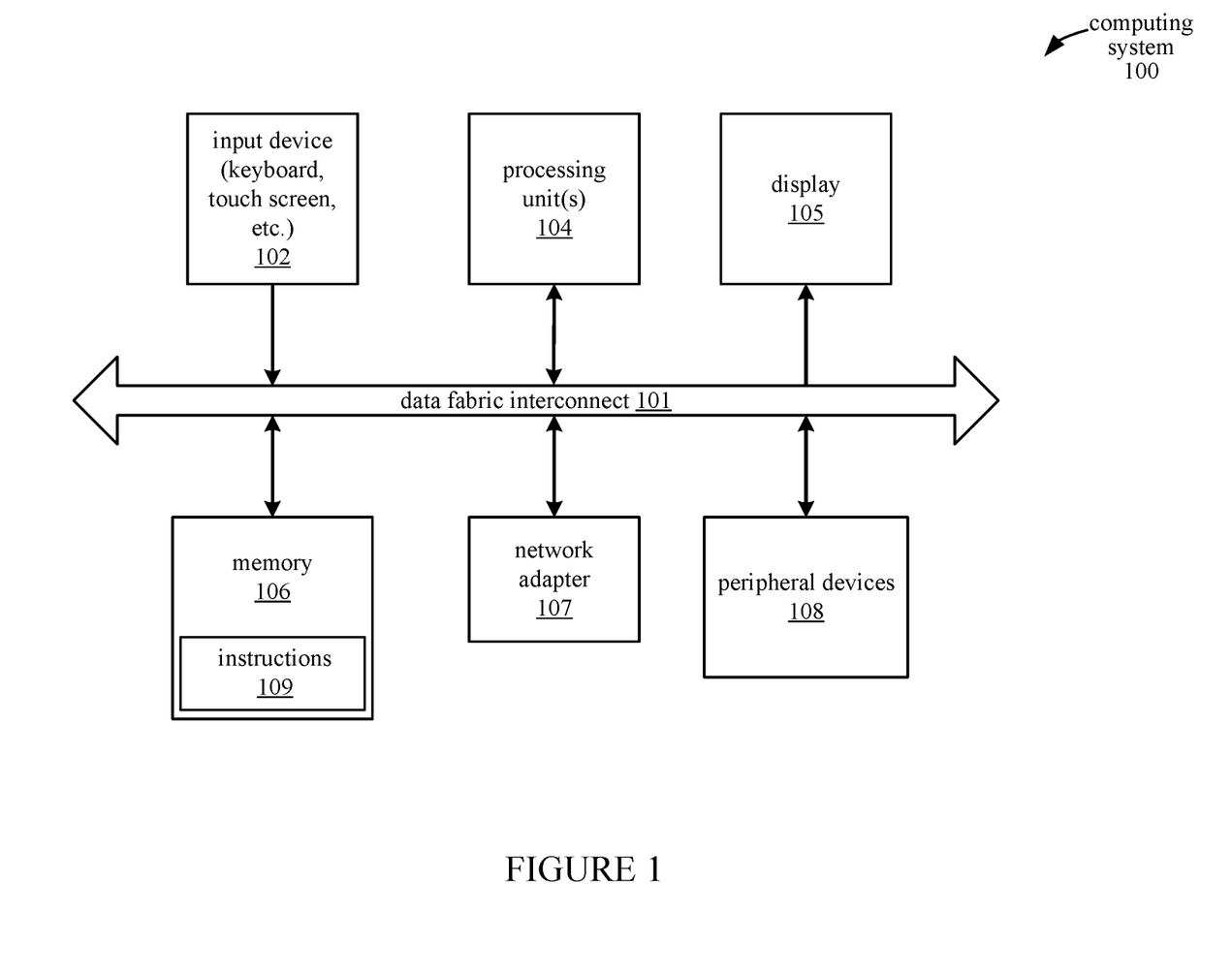
FIG. 1 is a block diagram of one embodiment of a computing system.

FIG. 1 illustrates an embodiment of a computing system 100 which operates a shared cache according to the above cache grouping scheme. In general, the computing system 100 is embodied as any of a number of different types of devices, including but not limited to a laptop or desktop computer, mobile device, server, etc. The computing system 100 includes a number of components 102-108 that communicate with each other through a data fabric interconnect 101. In computing system 100, each of the components 102-108 is capable of communicating with any of the other components 102-108 either directly through the data fabric interconnect 101, or via one or more of the other components 102-108. The components 101-108 in computing system 100 are contained within a single physical enclosure, such as a laptop or desktop chassis, or a mobile phone casing. In alternative embodiments, some of the components of computing system 100 are embodied as peripheral devices such that the entire computing system 100 does not reside within a single physical enclosure.

The computing system 100 also includes user interface devices for receiving information from or providing information to a user. Specifically, the computing system 100 includes an input device 102, such as a keyboard, mouse, touch-screen, or other device for receiving information from the user. The computing system 100 displays information to the user via a display 105, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 may include mass storage devices, location detection devices, sensors, input devices, or other types of devices used by the computing system 100.

Computing system 100 includes one or more processing units 104, which in the case of multiple processing units 104 are capable of operating in parallel. The processing units 104 receive and execute instructions 109 that are stored in the memory subsystem 106. In one embodiment, each of the processing units 104 includes multiple computing nodes that reside on a common integrated circuit substrate. Memory subsystem 106 includes memory devices used by the computing system 100, such as random-access memory (RAM) modules, read-only memory (ROM) modules, hard disks, and other non-transitory computer-readable media.

Some embodiments of computing system 100 may include fewer or more components than the embodiment as illustrated in FIG. 1. For example, certain embodiments are implemented without any display 105 or input devices 102. Other embodiments have more than one of a particular component; for example, an embodiment of computing system 100 could have multiple interconnects 101, network adapters 107, memory devices 106, etc.

Figure 2:
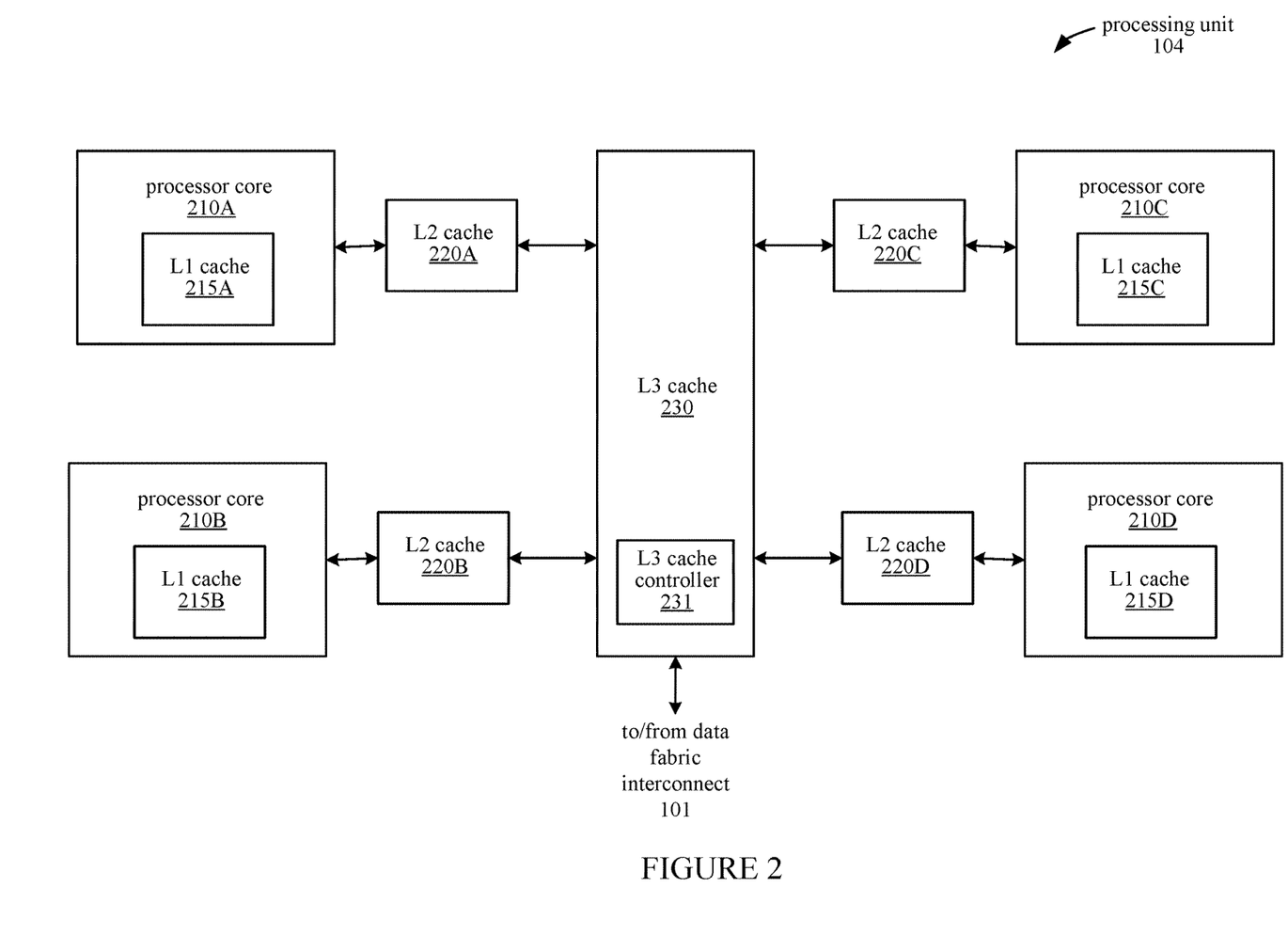
FIG. 2 is a block diagram of components in a processing unit, according to an embodiment.

FIG. 2 illustrates components in a processing unit 104, according to an embodiment. The processing unit 104 includes four processor cores 210A-D and a cache subsystem including L1 caches 215A-D, L2 caches 220A-D, and an L3 cache 230 that is shared between the processor cores 210A-D. The cache subsystem includes high-speed cache memories (e.g., L1 cache 215A-D, L2 cache 220A-D, and an L3 cache 230) that store blocks of data (not shown). As used herein, a "block" is a set of bytes stored in contiguous memory locations within the cache memories, which are treated as a unit for coherency purposes. Additionally, each of the terms "cache block", "block", "cache line", and "line" is interchangeable herein. In some embodiments, a block can also be the unit of allocation and deallocation in a cache. A block may be retrieved from other caches within the computing system 100, such as from other processing units or from the main memory.

The L3 cache 230 is shared by each of the processor cores 210A-D, such that data used in the execution of threads in any of the cores 210A-D can be cached in the L3 cache 230. L3 cache 230 is coupled to the data fabric interconnect 101 so the L3 cache can read and write from the main memory subsystem 106 and other devices (e.g., 102, 105, 107, 108) in the computing system. In other embodiments, processing unit 104 may include fewer or more processor cores (e.g., processor core 210A) and corresponding L2 caches (e.g., L2 cache 220A). In yet other embodiments, processing unit 104 may include other types of addressable cache subsystems that may include different numbers, types, and levels of cache memories.

Each of the cache devices 215A-D, 220A-D, and 230 includes a cache controller that intercepts read and write requests from the processor cores 210A-D that are directed to the main memory 106. Each cache controller then copies the data being accessed to its respective cache. When the cache controller adds new data to an already full cache, the cache controller selects a victim line to remove from the cache according to a replacement policy, which is a set of rules for identifying the least valuable data to keep in the cache (e.g., data that is least likely to be accessed again in the near future). In one embodiment, the cache controller of a shared cache also monitors a number of metrics for each user of the shared cache, identifies similar users based on the monitored metrics, and groups the similar users together for the purpose of applying different policies to each group. In the processing unit 104, this functionality is implemented in the shared L3 cache controller 231 of the shared L3 cache 230.

Figure 3:
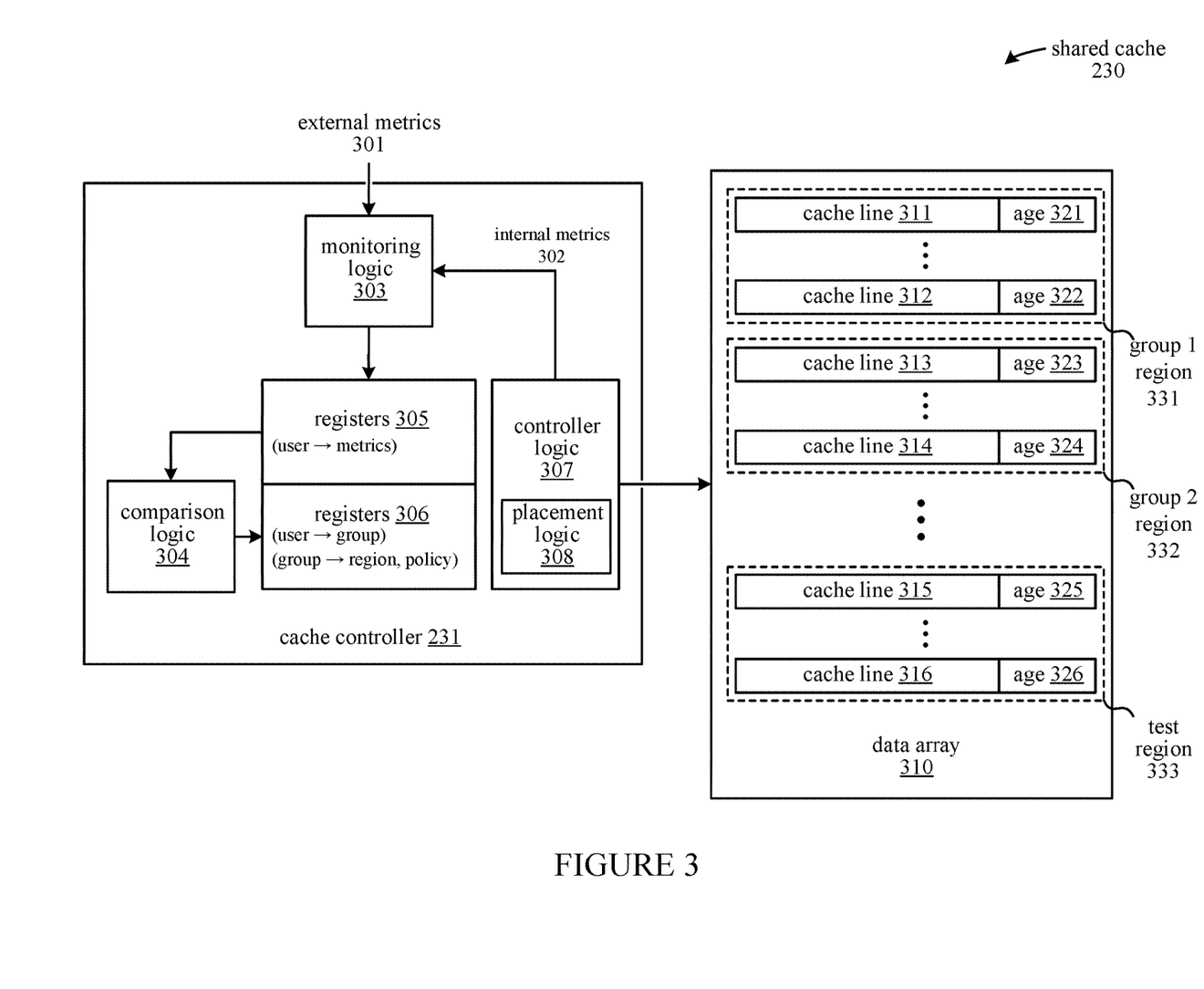
FIG. 3 is a block diagram of a shared cache device, according to an embodiment.

FIG. 3 illustrates components of a shared cache 230, including a cache controller 231 and a cache data array 310, according to an embodiment. The shared cache 230 is an L3 cache in the computing system 100. The cache controller 231 includes controller logic 307, which performs functions such as intercepting memory access requests directed to main memory 106 and other devices (e.g., 102, 107, 108, etc.), adding accessed data to the cache, performing capacity evictions when appropriate, performing lookups of cached data for servicing requests, etc.

In addition, the cache controller 231 includes monitoring logic 303, which monitors metrics for each of the users of the shared cache 230. In one embodiment, the shared cache 230 has at least two users, where each user represents a processing core or a thread executing in a processing core. Monitoring metrics for each thread can consume more resources, since each core could be executing more than one thread. Some of the metrics measured for the users of the shared cache 230 are internal metrics 302 that are received from the controller logic 307 within the same cache controller 231. These metrics 302 are detectable by the controller logic 307 and can include cache hit rates, traffic volume, or other metrics for each user. Other metrics are external metrics 301 that are received from other devices, such as other cache controllers, memory controllers, and peripheral devices in the system 100. For example, devices such as other memory controllers or peripheral devices can inform the monitoring logic 303 whether a particular cache miss was backed in local or remote memory, in a peripheral device, etc. Communicating metrics 301 with other devices also allows the shared cache 230 to cooperate with other devices in the system 100. For example, a cache user (e.g., a thread) occupies space in both a private L2 cache and the shared L3 cache 230; thus, both caches support the user's memory activity. The L3 cache 230 experiences high traffic volume and informs the L2 cache, which responds by adjusting its replacement policy to compensate for the increased latency. The L2 cache could, for example, adjust its policy to increase retention of lines used by latency sensitive applications so that these applications rely less on the L3 cache 230.

The monitoring logic 303 collects the metrics 301-302 for each of the users of the shared cache 230 and stores the metrics 301-302 in a set of registers 305, in which each user is associated with its respective set of metrics. For example, the metrics for a user may be stored in specific registers associated with the user, or the metrics may be recorded along with an identifier for the user. In some embodiments, the monitoring logic 303 also calculates new metrics based on the metrics 301-302 that are received, and associates the calculated metrics with their respective cache users in the registers 305. The monitored metrics can include, for each cache user, a hit rate, traffic volume, latency metrics, and others. The hit rate is the rate at which lines being looked up in the cache for the user are found. The traffic volume is the amount of cache accesses originating from the user. Latency metrics include metrics that indicate the latency for retrieving data from backing memory for memory access requests that result in cache misses. The latency can be measured from actual cache misses occurring during runtime, or inferred based on metrics indicating whether the missed data is stored in local or remote memory, whether the data is in a peripheral device 108 or the main memory 106, etc.

The recorded metrics are used to determine a degree of similarity between the cache users in the comparison logic 304. For each cache user, the comparison logic 304, calculates a degree of similarity between the metrics recorded for the cache user and the metrics of the other cache users sharing the same cache 230. The degree of similarity can be calculated as a sum of weighted differences of the respective metrics, for example, or using another function for calculating similarity or correlation. The comparison logic 304 then assigns each cache user to a group including other similar cache users. The comparison logic 304 performs this grouping computation periodically at runtime; thus, a particular cache user that changes its behavior can be reassigned from one group to another at runtime based on updated metrics. In one embodiment, the period for this group assignment reevaluation is determined by a configurable time constant. In alternative embodiments, the evaluation is performed continuously rather than according to a period defined by a time constant. The metrics and test region results are monitored continuously and re-grouping or policy changes are performed whenever the metrics and test results indicate that performance can be increased by doing so. In one embodiment, grouping of cache users is accomplished using criteria other than comparing of their monitored metrics. For example, different replacement policies can be tested on different users, and the users for which performance is optimized by the same policies can be assigned to the same groups.

The cache controller 231 includes registers 306 for associating each cache user with a group. In one embodiment, the registers 306 include, for each of the cache users, a register corresponding to the user that stores an identifier indicating a group for the user. Alternatively, the registers 306 store an identifier of the user along with the identifier of its group. In one embodiment, each group may include zero (e.g., when the group's identifier is not associated with any cache user), one cache user, or multiple cache users. In one embodiment, each of the cache users is included in no more than one group at a time, but can be reassigned to different groups at runtime by changing the group identifier stored in the registers 306 for the user. In one embodiment, each group is assigned to a set of physical ways in the cache's data array 310, and this association between the groups and their assigned set of physical ways (or other region) is also recorded in the registers 306.

The controller logic 307 intercepts memory requests directed to memory devices in the system 100, adds accessed data to the cache, and provides data to the requesting core if the data is already in the cache. The controller logic 307 operates according to one or more policies, each containing a set of rules for operation. For example, one type of policy is a replacement policy, which is used to determine which of the existing cache lines to evict to make space for a new cache line being added. A placement policy can be used to determine where (e.g., in which physical cache ways) to place incoming cache lines, whether another line is evicted or not. The controller logic 307 applies different policies to data from a cache user depending on the group to which the cache user is assigned. For example, if the users of the shared cache 230 are divided into two groups, the cache controller 231 operates the cache 230 according to a first policy for the first group of users and a second policy for the second group of users.

When a memory access is processed for a user, the user's group and the cache ways (or physical cache region) assigned to the group are looked up in the registers 306 by the placement logic 308 portion of the controller logic 307, and placed in the cache ways or region designated for the user's group. That is, data for users in a first group are placed in a first set of cache ways, while data for users in a second group are placed in a second set of cache ways. As illustrated in FIG. 3, the cache lines 311-312 are lines for a first group of cache users and are thus placed in a first region 331 (including a first set of cache ways) assigned to the first group in the data array 310. Cache lines 313-314 are for a second group of cache users and are thus placed in a second region 332 (including a second set of cache ways) assigned to the second group in the data array 310.

In one embodiment, a user's cache lines are prioritized for placement in the physical region assigned to its group, but can be placed outside the assigned region under certain conditions. For example, if the assigned region is full and contains cache lines all having a higher priority than the incoming cache line, or all recently used or added (e.g., the age property has a low value for all lines in the assigned region), the incoming cache line may be added to the cache in another group's region that is not full, contains older cache lines, or contains lines having a lower priority than the incoming cache line. In one embodiment, age values 321-324 are compared between cache lines in different groups to determine whether an incoming cache line assigned to region 331 will be added to another group's assigned region 332. For example, if all of the cache lines in the incoming line's assigned region 331 have an age value (e.g., 321-322) that is lower than the any age value (e.g., 323-324) in the other group's assigned region 332 by a set amount, then the incoming cache line is added in the other group's region 332 rather than replacing a line in its assigned region 331.

The controller logic 307 operates the cache 230 using a different set of policies for each group. For example, threads that are suited for a LRU replacement policy are included in a first group, while threads suited for a MRU replacement policy are included in a second group. Accordingly, the controller logic 307 applies the LRU replacement policy to data accessed for cache users in the first group, while applying the MRU policy for data accessed for users in the second group.

Policies are selected for a group based on the monitored metrics 301-302. For example, the metrics 301-302 may include the volume of memory access traffic for each cache user. In one embodiment, when the traffic volume metrics indicate that one or more users of the shared cache 230 have low traffic volume and one or more other users have high traffic volume, the high traffic and low traffic users are grouped separately. Different replacement policies are applied to the two groups. Replacement age and other parameters in the replacement policies may differ in favor of the low traffic users so they do not have their access to the cache 230 unfairly limited due to, for example, capacity evictions initiated by the high traffic users.

Some of the monitored metrics indicate whether the penalty for incurring a cache miss is high or low. For example, when a cache miss occurs, the missing data is retrieved from a cacheable DRAM device in the system 100, or an I/O device (including hard drives, peripheral devices, etc.) which has a much higher latency. Accordingly, a metric indicating the fraction of misses for a cache user that are directed to an I/O device instead of a cacheable memory indicates whether the miss penalty for the user is high. Similarly, data retrieved from remote memory incurs a higher penalty than data that is in a local memory. Based on these metrics, users typically incurring high penalties for cache misses can be grouped separately from users typically incurring lower penalties for cache misses. A policy that results in fewer cache misses (e.g., a replacement policy with a higher replacement age) can be used for high miss penalty users to reduce the cache miss rate, relative to the low miss penalty users. In other embodiments, other metrics 301 and 302 can be used to determine which types of policies can improve performance for the users of the shared cache 230. Another type of metric that can be monitored is the cache miss value. Some cache misses impact performance more than others; for example, a miss occurring when a processing core is waiting for the response before continuing further processing (i.e., resulting in an execution stall) has a higher value than a miss for a data prefetch that will be used hundreds of cycles later. The cache obtains information from the core about the value of requests that subsequently miss (e.g., an indication that the request is the oldest request for its thread).

In one embodiment, the data array 310 of cache 230 includes one or more test regions (e.g., test region 333) for determining which policies increase or maximize performance for the users of cache 230. Some cache lines 325-326 including data for an individual user (e.g., thread or core) can be placed in the test region 333, and different policies are tested on the data while it is in the test region 333. Metrics 301-302 are collected for the cache lines in the test region 333 and compared with the metrics for the same user in its normal assigned region, in which a current policy is applied. Thus, the difference in performance between the test policy and the current policy can be evaluated for the user. If applying the test policy results an increase in performance (e.g., indicated by an increase in hit rate, increase in throughput, etc.) relative to the current policy, then the current policy is switched to the test policy. A single test policy or multiple test policies can be tested in the test region 333 concurrently for a single user or multiple users.

In one embodiment, the groups of cache users need not be physically partitioned into assigned regions or sets of ways, but are handled according to different policies based on user properties or metadata associated with the cached data belonging to the users. For example, the age field (e.g., 321-326) can be initially set or updated differently for users in different groups. The age field contains a value that is used according to a replacement policy to determine whether a cache line can be evicted from the cache, where a higher age value indicates that the line is less likely to be used again in the future, and more likely to be evicted. Accordingly, the age value can be adjusted per group; for instance, lines added to the cache for a low bandwidth, high miss latency, and latency sensitive cache user or group can be inserted with a lower initial age value than other cache users or groups. Then, the lines of the latency sensitive cache user are less likely to be evicted unfairly by other higher bandwidth users.

Figure 4:
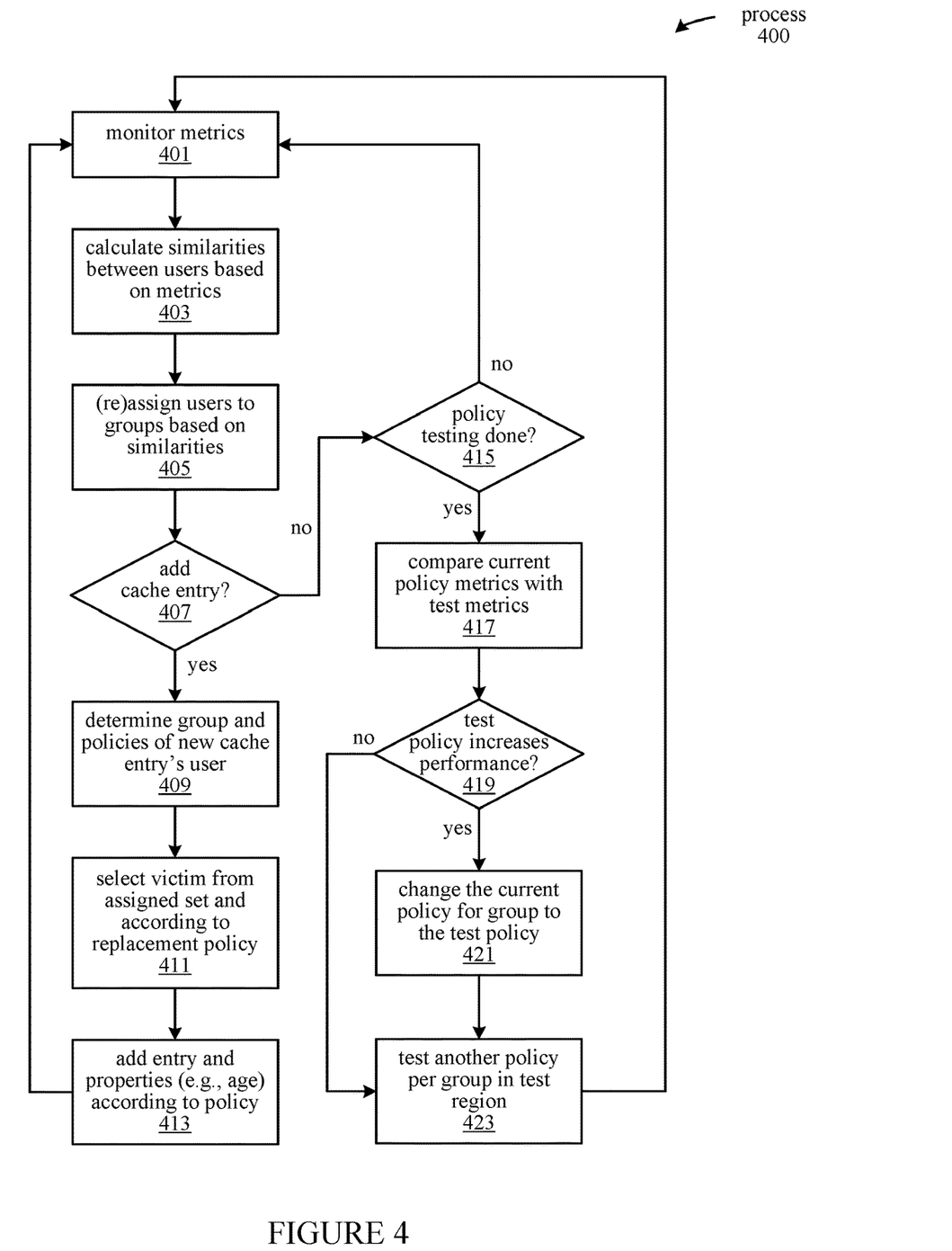
FIG. 4 is a flow diagram illustrating a process for operating a shared cache, according to an embodiment.

FIG. 4 illustrates a process 400 for operating a shared cache that groups cache users and applies different policies to the groups, according to an embodiment. The operations in process 400 involve components in the computing system 100, including the cache controller 231 and data array 310 in the shared cache 230, among others.

At block 401, the monitoring logic 303 in the cache controller 231 monitors the external metrics 301 and internal metrics 302 for each of the users of the shared cache 230. In one embodiment, each cache user is a thread being executed in one of the processor cores 210A-D. In alternative embodiments, each user is one of the processing cores 210A-D, where each core can execute multiple threads. For each cache user, the metrics can include a cache hit rate (or miss rate) for data associated with the cache user, a traffic volume for the data, a cache miss penalty (e.g., latency) for the data, etc. The metrics can also include the proportion of data that is retrieved from local memory instead of remote memory when cache misses occur, or retrieved from cacheable main memory (e.g., DRAM) instead of an I/O device. The metrics 301-302 are recorded in the registers 305 for each user.

At block 403, the comparison logic 304 calculates the degree of similarity between the cache users based on the monitored metrics 301-302. In one embodiment, users' metrics are similar if the metrics fall within the same range, or if the metrics differ from each other by less than a threshold amount. Similarity between users can alternatively be determined by other functions, such as a weighted sum or average of the metrics, etc.

At block 405, the comparison logic 304 assigns each of the cache users to a group based on the calculated degree of similarity between the user and the other users in the group. In one embodiment, each user is included in no more than one group at a time. At block 405, the comparison logic 304 also associates each group with an initial policy, which determines how the cache 230 operates on data for users in the group. The initial policy may be selected based on the metrics for the users in the group, or a standard policy may be used for each group that can be changed after testing determines a more suitable policy. The policy can include a replacement policy, or other policies that affect how properties of cache entries are initially set or updated during operation of the cache 230. In the registers 306, each cache user is associated with its assigned group, and each group is associated with its policies. In one embodiment, each group is also associated with a physical region in the cache 230, such as a set of physical ways. For example, as illustrated in FIG. 3, group 1 is associated with region 331 and group 2 is associated with region 332. In alternative embodiments, policies are applied to groups without assigning the groups to any physical regions.

Blocks 401-407 and 415 are repeated in a loop while no cache entry is added (at block 407) and policy testing (i.e., testing of new policies in the test region 333) has not completed. The process 400 thus continues monitoring metrics for each user over time during the operation of the shared cache 230. When metrics for a user change due to, for example, a change in the user's behavior, the user can be reassigned to a different group, as provided at block 405. For instance, a low bandwidth thread that increases its throughput can be reassigned to a group with other high bandwidth threads when the change is detected via the monitored metrics 301-302.

Blocks 407-413 of the process 400 describe the operation of the cache according to different policies for each user group. As illustrated in FIG. 3, cache lines 311-312 contain data for users in a first group, while cache lines 313-314 contain data for users in a second group. Accordingly, a different policy is applied to cache lines 311-312 than to cache lines 313-314. While blocks 407-413 describe adding a cache entry (e.g., a cache line) for a user, the process can be generalized to other actions performed by the cache 230.

At block 407, if a cache entry is being added for a particular user, the process 400 continues at block 409. At block 409, the controller logic 307 determines the group to which the user is assigned and the set of policies associated with the assigned group, including a replacement policy. At block 411, a victim entry is selected for eviction from the cache to free space for the new cache entry. The victim is selected according to a set of factors including the region (e.g., set of physical ways) assigned to the group, the replacement policy, and properties of the existing cache entries, such as the age property. The placement logic 308 identifies the physical region assigned to the user's group and attempts to select the victim from the assigned region.

However, a victim can be selected from outside the group's assigned physical region (e.g., from a region assigned to another group) if all of the entries in the region have a higher priority than the incoming cache entry. In this case, a lower priority cache entry from a different region in the cache 230 is selected as the victim. The replacement policy (e.g., LRU) is used to select a victim from among these entries in the assigned region or outside the assigned region, based on the age values, or other metadata describing the entries. Accordingly, data associated with a group of cache users is placed in the assigned set of ways (or other assigned region) in the cache when the data has a higher priority than at least one entry that can be evicted from the assigned set of ways, as indicated by the age property. When the data has a lower priority than any entry in the assigned set of ways, the data is placed outside the assigned set.

At block 413, the controller logic 307 evicts the selected victim from the cache 230, performing a write-back and/or other operations as appropriate, and adds the new cache entry in its place. The controller logic 307 also records metadata properties, including an age value (e.g., 321, etc.) for the entry. The age value for the new entry is calculated based on the policy associated with the cache user's group. As previously described, the age property can be adjusted to allow some users' cache entries to be retained for longer or shorter times in the cache 230. The calculated metadata properties are associated with the new cache entry in the cache 230.

The cache controller 231 also performs testing of alternative policies to determine whether implementing a different policy for one or more of the groups can improve performance (e.g., increase the hit rate, decrease latency, etc.). The cache controller 231 thus partitions a subset of the cache entries for one or more groups in a test region 333 and applies a test policy to the entries in the test region 333. The entries in the test region 333 are otherwise treated similarly to their group's entries in the group's assigned region. In one embodiment, the entries in the test region are placed in the region 333 by the operations described above at blocks 411-413. That is, the placement logic 308 places some of the incoming entries in the test region 333, so that the test policy can be tested on those entries. During a testing period, metrics are collected for each group's entries in the test region 333 to determine whether the test policy increases performance relative to the current policy being applied to the groups' entries in other regions.

From block 413, the process 400 returns to block 401 to continue monitoring the metrics 301 and 302 for each cache user. The process 400 repeats blocks 401-413 to operate the shared cache 230 according to the assigned policies. Thus, when a cache entry is added for a user in a second group, a victim is selected from a different region (e.g., a different set of physical ways) that is assigned to the second group, and according to a different replacement policy (e.g., MRU instead of LRU) that is associated with the second group.

At the end of a testing period, the process 400 continues from block 415 to block 417. At block 417, the comparison logic 304 compares the metrics observed during the testing period for entries in the test region 333 with the metrics observed for entries belonging to the same group that are located in its normal assigned region. If the test policy increases performance (as indicated by performance metrics such as a higher hit rate, decreased latency, etc.) for the group in the test region 333, then the process 400 continues at block 421. At block 421, the current policy is changed to the test policy for the group, and thus after updating the policy, the cache is operated according to the former test policy for the users in the group.

The process 400 continues from block 421 (when the test policy increases performance) or from block 419 (when the tested policy does not increase performance) to block 423. Thus, whether or not the current policy is changed to the former test policy, the test region 333 can be used to test another policy for the duration of the next test period, as provided at block 423. From block 423, the process 400 returns to block 401 to continue monitoring metrics and grouping cache users as previously described. During operation of the cache 230, blocks 415-423 repeat periodically to test and compare the performance impact of different policies, and to dynamically switch policies for one or more groups during runtime to optimize cache performance.

In an alternative embodiment, time division multiplexing is used to apply the current policy and the test policy to a group's cache entries in different phases. In this implementation, a normal phase during which a current policy is applied is periodically transitioned to a testing phase in which a test policy is applied. Performance metrics observed during the normal phase and testing phase are then compared to determine whether the test policy can be applied to increase performance. In one embodiment, the test policy is applied to the entire region assigned to the group during the testing phase. In an alternative embodiment, the test policy is applied in a limited test region 333 during the testing phase, or in a portion of the group's assigned region.

A method may include monitoring one or more metrics for each of a plurality of cache users sharing a cache, and assigning each of the plurality of cache users to one of a plurality of groups based on the monitored one or more metrics.

The method may also include operating the cache according to a first policy for a first group of the plurality of cache users, and operating the cache according to a second policy for a second group of the plurality of cache users.

In the method, the first policy may include a first replacement policy, the second policy may include a second replacement policy, and the method may also include selecting a first victim entry for eviction from the cache based on the first replacement policy when adding a first cache entry for one of the first group of the cache users, and selecting a second victim entry for eviction from the cache based on the second replacement policy when adding a second cache entry for one of the second group of the cache users.

The method may also include, in connection with adding a cache entry for one of the plurality of cache users, calculating a property for the cache entry based on whether the cache user is in the first group or the second group, associating the property with the cache entry in the cache, and selecting the cache entry for eviction from the cache based on the property.

The method may also include, for one or more cache users of the plurality of cache users, operating the cache according to a test policy for a subset of cache entries associated with the one or more cache users, replacing the first policy with the test policy based on comparing performance metrics observed for the first policy with performance metrics observed for the test policy, and after the replacing, operating the cache according to the test policy for the first group of the cache users.

The method may also include placing data associated with the first group of cache users in a first set of ways in the cache, and placing data associated with the second group of cache users in a second set of ways in the cache.

The method may also include placing data associated with the first group of cache users in a first set of ways in the cache when the data has a higher priority than at least one entry in the first set of ways, and placing the data outside the first set of ways when the data has a lower priority than any entry in the first set of ways.

The method may also include, for each group of the plurality of groups, for each cache user assigned to the group, processing one or more cache entries associated with the cache user according to the policy associated with the group. Each of the plurality of cache users may include a thread executing in a processing core.

In the method, for each cache user of the plurality of cache users, the one or more metrics may include a hit rate for data associated with the cache user, a traffic volume of the data, and a cache miss penalty for the data.

The method may also include, for each cache user assigned to a first group of the plurality of groups, associating the cache user with the first group based on a degree of similarity between the one or more metrics of the cache user and the one or more metrics of other cache users in the first group.

The method may also include, based on the monitored one or more metrics for a first cache user in the first group, reassigning the first cache user from the first group to a second group of the plurality of groups. Each of the plurality of cache users is included in no more than one of the first group and the second group.

A computing device may include monitoring logic to monitor one or more metrics for each of a plurality of cache users sharing a cache, and controller logic coupled with the monitoring logic to assign each of the plurality of cache users to one of a plurality of groups based on the monitored one or more metrics.

In the computing device, each of the plurality of cache users may include a processing core coupled with the cache. The controller logic may operate the cache according to a first policy for a first group of the plurality of cache users, and may operate the cache according to a second policy for a second group of the plurality of cache users.

The computing device may also include a set of registers coupled with the monitoring logic to record the one or more metrics from the controller logic and from one or more other memory devices. For each cache user of the plurality of cache users, the one or more metrics include a hit rate for data associated with the cache user, a traffic volume of the data, and a cache miss penalty for the data.

The computing device may also include a set of registers coupled with the controller logic to associate each of the plurality of cache users with one of a first group and a second group, where the plurality of groups includes the first group and the second group, and associate the first group with the first policy and the second group with the second policy.

In the computing device, the plurality of groups includes at least a first group and a second group. The controller logic may also include placement logic coupled with the set of registers to place data associated with the first group of cache users in a first set of ways in the cache, and place data associated with the second group of cache users in a second set of ways in the cache.

The computing device may also include comparison logic to, for each cache user in the first group, calculate a degree of similarity between the one or more metrics of the cache user and the one or more metrics of other cache users in the first group. The control logic further, based on the monitored one or more metrics for a first cache user in the first group, reassigns the first cache user from a first group of the plurality of groups to a second group of the plurality of groups. Each of the plurality of cache users is included in no more than one of the first group and the second group.

A computing system may include a plurality of processing cores, a shared cache to cache data for each of the plurality of processing cores, and a cache controller coupled with the shared cache to monitor one or more metrics for each of a plurality of cache users sharing the shared cache, and assign each of the plurality of cache users to one of a plurality of groups based on the monitored one or more metrics.

In the computing system, each of the plurality of cache users may include one of the plurality of processing cores. The cache controller may further operate the shared cache according to a first policy for a first group of the cache users, and operate the shared cache according to a second policy for a second group of the cache users.

In the computing system, the plurality of groups includes a first group and a second group. The cache controller may associate each of the plurality of cache users with one of the first group and the second group, associate the first group with the first policy and the second group with the second policy, place data associated with the first group of cache users in a first set of ways in the cache, and place data associated with the second group of cache users in a second set of ways in the cache.

In the computing system, the cache controller, for each cache user in the first group, may calculate a degree of similarity between the one or more metrics of the cache user and the one or more metrics of other cache users in the first group, and based on the monitored one or more metrics for a first cache user in the first group, may reassign the first cache user from the first group to a second group of the plurality of groups. Each of the plurality of cache users is included in no more than one of the first group and the second group.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A method, comprising:
monitoring one or more performance metrics for each of a plurality of cache users sharing a cache; and
assigning each cache user of the plurality of cache users to a group of a plurality of groups of cache users based on a degree of similarity between the cache user and other cache users in the group, wherein the degree of similarity is calculated based on the monitored one or more performance metrics.

2. The method of claim 1, further comprising:
operating the cache according to a first policy for a first group of the plurality of cache users; and
operating the cache according to a second policy for a second group of the plurality of cache users, wherein the plurality of groups includes the first group and the second group.

3. The method of claim 2, wherein:
the first policy comprises a first replacement policy;
the second policy comprises a second replacement policy; and
the method further comprises:
    selecting a first victim entry for eviction from the cache based on the first replacement policy when adding a first cache entry for one of the first group of the cache users, and
    selecting a second victim entry for eviction from the cache based on the second replacement policy when adding a second cache entry for one of the second group of the cache users.

4. The method of claim 2, further comprising:
in connection with adding a cache entry for one of the plurality of cache users, calculating a property for the cache entry based on whether the cache user is in the first group or the second group;
associating the property with the cache entry in the cache; and
selecting the cache entry for eviction from the cache based on the property.

5. The method of claim 2, further comprising:
for one or more cache users of the plurality of cache users, operating the cache according to a test policy for a subset of cache entries associated with the one or more cache users;
replacing the first policy with the test policy based on comparing first performance metrics observed for the first policy with second performance metrics observed for the test policy; and
after the replacing, operating the cache according to the test policy for the first group of the cache users.

6. The method of claim 2, further comprising:
placing data associated with the first group of cache users in a first set of ways in the cache; and
placing data associated with the second group of cache users in a second set of ways in the cache.

7. The method of claim 2, further comprising:
placing data associated with the first group of cache users in a first set of ways in the cache when the data has a higher priority than at least one entry in the first set of ways; and
placing the data outside the first set of ways when the data has a lower priority than any entry in the first set of ways.

8. The method of claim 1, further comprising, for each group of the plurality of groups:
for each cache user assigned to the group, processing one or more cache entries associated with the cache user according to the policy associated with the group, wherein each of the plurality of cache users comprises a thread executing in a processing core.

9. The method of claim 1, wherein, for each cache user of the plurality of cache users, the one or more performance metrics include:
a hit rate for data associated with the cache user,
a traffic volume of the data, and
a cache miss penalty for the data.

10. The method of claim 1, further comprising:
based on the monitored one or more performance metrics for a first cache user in a first group of the plurality of groups, reassigning the first cache user from the first group to a second group of the plurality of groups, wherein each of the plurality of cache users is included in no more than one of the first group and the second group.

11. A computing device, comprising:
monitoring logic configured to monitor one or more performance metrics for each of a plurality of cache users sharing a cache; and
controller logic coupled with the monitoring logic and configured to assign each cache user of the plurality of cache users to a group of a plurality of groups of cache users based on a degree of similarity between the cache user and other cache users in the group, wherein the degree of similarity is calculated based on the monitored one or more performance metrics.

12. The computing device of claim 11, wherein:
each of the plurality of cache users comprises a processing core coupled with the cache; and
the controller logic is further configured to:
operate the cache according to a first policy for a first group of the plurality of cache users; and
operate the cache according to a second policy for a second group of the plurality of cache users.

13. The computing device of claim 11, further comprising:
a set of registers coupled with the monitoring logic and configured to record the one or more performance metrics from the controller logic and from one or more other memory devices, wherein for each cache user of the plurality of cache users, the one or more performance metrics include:
a hit rate for data associated with the cache user,
a traffic volume of the data, and
a cache miss penalty for the data.

14. The computing device of claim 11, further comprising a set of registers coupled with the controller logic and configured to:
associate each of the plurality of cache users with one of a first group and a second group, wherein the plurality of groups includes the first group and the second group; and
associate the first group with a first policy and the second group with a second policy.

15. The computing device of claim 11, wherein:
the plurality of groups includes at least a first group and a second group; and
the controller logic further comprises placement logic coupled with the set of registers and configured to:
place data associated with the first group in a first set of ways in the cache; and
place data associated with the second group in a second set of ways in the cache.

16. The computing device of claim 11, further comprising:
comparison logic configured to, for each cache user in the first group, calculate the degree of similarity between the one or more performance metrics of the cache user and the one or more performance metrics of other cache users in the first group,
wherein:
the control logic is further configured to, based on the monitored one or more performance metrics for a first cache user in a first group of the plurality of groups, reassign the first cache user from the first group to a second group of the plurality of groups, and
each of the plurality of cache users is included in no more than one of the first group and the second group.

17. A computing system, comprising:
a plurality of processing cores;
a shared cache configured to cache data for each of the plurality of processing cores; and
a cache controller coupled with the shared cache and configured to:
monitor one or more performance metrics for each of a plurality of cache users sharing the shared cache, and
assign each cache user of the plurality of cache users to a group of a plurality of groups of cache users based on a degree of similarity between the cache user and other cache users in the group, wherein the degree of similarity is calculated based on the monitored one or more performance metrics.

18. The computing system of claim 17, wherein:
each of the plurality of cache users comprises one of the plurality of processing cores; and
the cache controller is further configured to:
operate the shared cache according to a first policy for a first group of the cache users, and
operate the shared cache according to a second policy for a second group of the cache users.

19. The computing system of claim 17, wherein:
the plurality of groups includes a first group and a second group; and
the cache controller is further configured to:
associate each of the plurality of cache users with one of the first group and the second group;
associate the first group with a first policy and the second group with a second policy;
place data associated with the first group of cache users in a first set of ways in the cache; and
place data associated with the second group of cache users in a second set of ways in the cache.

20. The computing system of claim 17, wherein the cache controller is further configured to:
for each cache user in a first group of the plurality of groups, calculate the degree of similarity between the one or more performance metrics of the cache user and the one or more performance metrics of other cache users in the first group; and
based on the monitored one or more performance metrics for a first cache user in the first group, reassign the first cache user from the first group to a second group of the plurality of groups, wherein each of the plurality of cache users is included in no more than one of the first group and the second group.

* * * * *